United States Patent [19]

Jordan, Jr.

[11] Patent Number: 5,424,948
[45] Date of Patent: Jun. 13, 1995

[54] LOCOMOTIVE TRACTION CONTROL SYSTEM USING FUZZY LOGIC

[75] Inventor: Lawrence B. Jordan, Jr., Bolingbrook, Ill.

[73] Assignee: General Motors Corporation, Detroit, Mich.

[21] Appl. No.: 150,645

[22] Filed: Nov. 10, 1993

[51] Int. Cl.⁶ .............................................. B60T 8/58
[52] U.S. Cl. .......................... 364/426.03; 364/426.01; 180/197; 303/102; 303/103; 303/96; 395/900
[58] Field of Search ..................... 364/426.01, 426.02, 364/426.03, 426.04, 426.05, 424.02; 180/197; 303/95, 96, 102, 103; 395/900

[56] References Cited

U.S. PATENT DOCUMENTS

| | | | |
|---|---|---|---|
| 4,842,342 | 6/1989 | Takahashi et al. | 303/102 |
| 5,001,640 | 3/1991 | Matsumoto et al. | 364/426.02 |
| 5,082,081 | 1/1992 | Tsuyama et al. | 180/197 |
| 5,155,686 | 10/1992 | Shiraishi et al. | 364/426.03 |
| 5,195,808 | 3/1993 | Johnsen | 303/113.2 |
| 5,272,428 | 12/1993 | Spiegel et al. | 318/803 |
| 5,303,153 | 4/1994 | Sakai et al. | 364/424.1 |

OTHER PUBLICATIONS

Jordan, L. B., Jr. "Locomotive Traction Control System Using Fuzzy Logic", *Rensselear Polytechnic Institute*, (1992), Nov. 18, 1992.

IEEE Transactions on Systems, Man and Cybernetics, vol. 20, No. 2. Mar./Apr. 1990, pp. 419–435, "Fuzzy Logic in Control Systems: Fuzzy Logic Controller, Part II", Chuen Chien Lee.

Primary Examiner—Kevin J. Teska
Assistant Examiner—Susan Wieland
Attorney, Agent, or Firm—Howard N. Conkey

[57] ABSTRACT

A locomotive traction controller system using fuzzy logic to maximize the coefficient of friction between locomotive drive wheels and the rail on which the wheels ride. The locomotive traction system includes a fuzzy logic slip controller that provides a generator reference signal to a generator controller that controls the field current of the generator of the locomotive. The fuzzy logic slip controller regulates to a predetermined wheel slip regardless of the rail condition. A fuzzy logic slip reference estimator applies a wheel slip reference signal to the fuzzy slip controller depending on the rail condition in order to adjust the generator reference signal and thus modify the wheel slip to maximize the coefficient of friction.

56 Claims, 4 Drawing Sheets

LOCOMOTIVE TRACTION CONTROL SYSTEM USING FUZZY LOGIC

BACKGROUND OF THE INVENTION

1. Field of the Invention

This invention relates generally to a traction control system and, more particularly, to a traction control system using fuzzy logic to control wheel slip of the drive wheels of a train locomotive in order to maximize the coefficient of friction between the drive wheels and the rail interface.

2. Discussion of the Related Art

As is well understood, train locomotives, such as diesel electric locomotives, used to move railway cars along a dual rail configuration are propelled by exerting torque to drive wheels associated with the locomotive that are in contact with the rails. The power to propel the locomotive is first developed as mechanical energy by a high horsepower diesel engine. The diesel engine drives a generator that converts the mechanical energy to electrical energy. The electrical energy is then converted back to mechanical energy by a series of traction motors. One traction motor is rigidly connected to each axle associated with a pair of drive wheels such that when the axle is rotated, the drive wheels also rotate. In this manner, each traction motor is in parallel with the generator and rotates independently of the other axles. The specifics of the mechanisms for propelling a locomotive are well known.

Friction between the drive wheel and the rail interface provides the traction for causing the movement of the locomotive. If there were no friction between the drive wheels and the rail surface, the wheels would rotate and slip relative to the rails without providing movement to the locomotive. The friction force is a function of the coefficient of friction between the drive wheels and the rail interface, and the downward force exerted by the locomotive on the rail. Wheel slip is the value that characterizes the difference in linear speed between the locomotive and the drive wheels. The more friction between the drive wheels and the rail surface, the more traction can be generated, and thus, the more propelling force is available to move the locomotive. It is possible to increase the friction force between the drive wheels and the rail surface by increasing the weight of the locomotive. However, certain well understood engineering and economic factors make this option unattractive. Therefore, locomotives incorporate traction control systems in order to maximize the friction force between the drive wheels and the rail surface, so as to maximize the propelling force of the traction motors.

A traction control system may have two control variables that can be used to control the amount of wheel slip of the drive wheels relative to the rails. First, the power output of the generator can be reduced, which leads to lower traction motor torques, which in turn leads to less force causing the drive wheels to spin. However, reduced generator power provides less power to propel the locomotive. Second, the locomotive can drop sand in front of the wheels, thus creating a greater friction relationship between the drive wheels and the rail surface. However, limited payload and cost of sand require that this method of control be used conservatively. Consequently, the only practical way to maximize the friction force is to maximize the value of the coefficient of friction between the drive wheels and the rails.

When torque is applied to the drive wheels during operation of the locomotive, the wheels will begin to slip at an increasing rate until the slip reaches an equilibrium wheel slip level when the torque acting on the wheels balances out. More or less torque will cause the wheels to slip at a different rate, thus changing the time at which equilibrium is reached. If the friction/slip relationship between the drive wheels and the rail interface increased monotonically, no control system would be required. Under most rail conditions, however, the graphical relationship between the coefficient of friction and the wheel slip reaches a peak at a location depending on the torque being applied and other system conditions, and then declines.

FIG. 1 shows a graphical relationship between the coefficient of friction on the vertical axis and the percent of wheel slip on the horizontal axis for dry, wet and oily rail conditions. A graph line for each coefficient of friction versus percentage of wheel slip is given for the different rail conditions in each direction of rotation of the drive wheels. As is apparent by viewing FIG. 1, under dry rail conditions, the coefficient of friction is at its maximum at about 10% wheel slip. It is noted that under ideal dry rail conditions, the torque that a locomotive engine can generate is not high enough to cause the wheel slip to increase to this value. Once the rail becomes wet and/or oily, the percentage of wheel slip at which the maximum coefficient of friction is attained increases. Particularly, for a wet rail condition, the maximum coefficient of friction is at approximately 15% wheel slip. For oily rail conditions, the maximum coefficient of friction is given at about 30% wheel slip. Wheel slip above 25%, however, can cause excessive wear or even damage to both the wheels and the rail. The region of each graph line before reaching the peak is a stable region of operation, however, the region of each graph line beyond the peak is an unstable region in which predictable wheel rotation is indeterminable.

The goal, therefore, of a traction control system that attempts to maximize the coefficient of friction is to operate as close to the peak of the friction/slip curve as possible, while avoiding the unstable region. The general strategy of the traction control system is to estimate the slip level at which the friction/slip curve reaches its peak value, and to regulate the system so that the wheel slip does not exceed this value. When the wheel slip is close to the unstable region, control action must be taken to remain in the stable region. This task is made more difficult because the exact characteristics of the friction/slip curve is never known as rail conditions can rapidly change causing the estimated peak to be at a higher slip value than the actual peak. Abnormal rail conditions may cause a friction/slip characteristic that increases asymptotically to a maximum coefficient of friction. A traction control system must limit wheel oscillation while correcting the estimation of the friction/slip curve peak.

Prior art traction control systems generally consist of cascaded single input and single output controllers. The innermost controller loop controls the generator's field current by varying the generator's field voltage source. A reference field current is generated by a generator output controller for establishing the generator field current. The generator output controller regulates the generator so the generator's operating characteristics follow a desired pattern based on a system model of the locomotive. The system model would include a generator model, a generator field model, and a model representing the field current controller and the generator output controller. A simplification can be made because the closed loop response of the actual generator controller is known.

Traction control system models which define the rotation of an axle generally assume that the wheels associated with an axle rotate at the same angular velocity and experience the same coefficient of friction. In reality, differences in the coefficient of friction exist between the two wheels of an axle exists such that torsional forces are generated in the wheel axle and differing angular velocities occur for the two wheels.

Because of the many factors which effect the friction/slip relationship, it is necessary to incorporate traction control models that are robust enough to compensate for these variances so as to increase the coefficient of friction between the drive wheels and the rail interface. It is therefore an object of the present invention to provide a traction control system with increased capabilities over the prior art systems.

SUMMARY OF THE INVENTION

In accordance with the teachings of the present invention, a locomotive traction control system is disclosed which incorporates the use of fuzzy logic to maximize the coefficient of friction between the locomotive drive wheels and the rails on which the wheels ride. The locomotive traction control system includes a fuzzy logic slip controller that provides a generator current reference signal to a generator controller controlling the field current of a generator associated with the locomotive. The generator generates electricity which energizes electrical traction motors for driving the drive wheels. Depending on certain variables such as drive wheel speed, locomotive ground speed, and traction motor currents, the fuzzy slip controller determines the appropriate generator current reference signal that will cause the generator controller to provide an output of the generator to cause a predetermined wheel slip regardless of the rail condition. A fuzzy logic slip reference estimator uses the same variables as the fuzzy slip controller to generate a wheel slip reference signal indicative of the desirable wheel slip depending on the current rail conditions that will maximize the coefficient of friction. The slip reference signal is applied to the fuzzy slip controller so as to update the generator current reference signal to be consistent with the maximum coefficient of friction for that rail condition. Therefore, the fuzzy slip controller will provide a signal to the generator control so as to control the generator of the locomotive to output the appropriate power for the maximum coefficient of friction.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments concerning a traction control system for a locomotive is merely exemplary in nature and is in no way intended to limit the invention or its application or uses.

Figure 1:
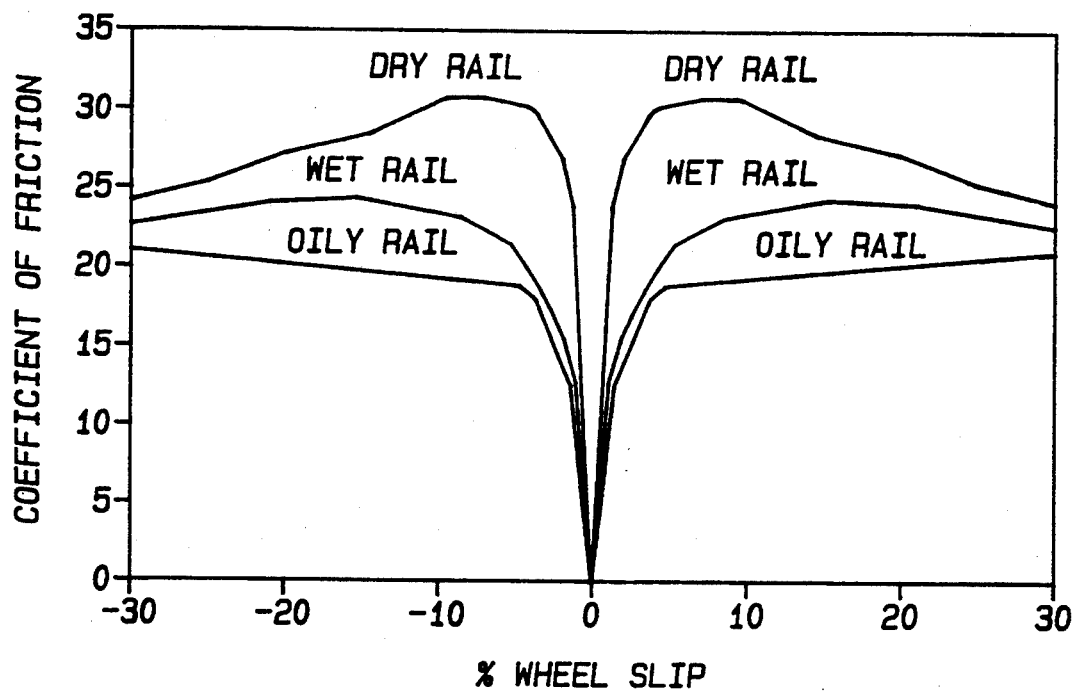
FIG. 1 is a graph showing the relationship between percent of wheel slip on the horizontal axis and the coefficient of friction on the vertical axis between drive wheels of a locomotive and the rail surface.
Figure 2:
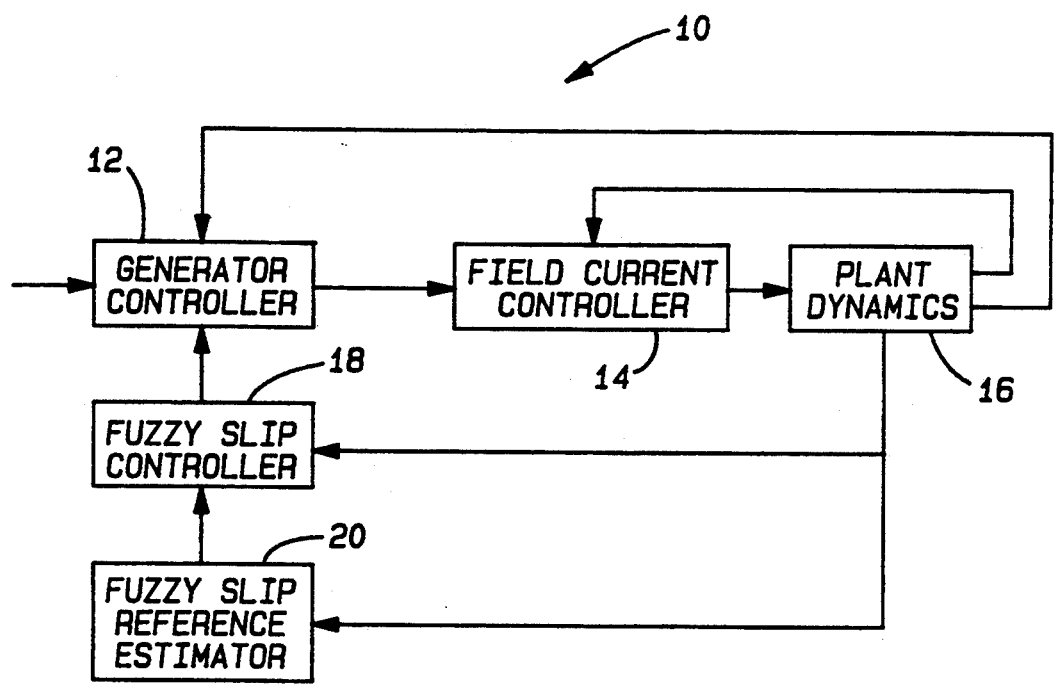
FIG. 2 is a block diagram of a locomotive traction control system according to a preferred embodiment of the present invention.

Turning to FIG. 2, a locomotive traction control system 10, according to a preferred embodiment of the present invention, is shown in a block diagram format. The traction control system 10 includes a generator controller 12, a field current controller 14 and plant dynamics 16. The generator controller 12 receives generator voltage, generator current and power limit control signals as inputs from other locomotive control systems, such as an operator controller. The generator controller 12 provides a field current reference signal to the field current controller 14. The field current controller 14 outputs a field voltage signal to the plant dynamics 16. The plant dynamics 16 is representative of at least the engine, the generator and the traction motors of the locomotive. The field current reference signal adjusts the field current of the generator so as to modify the power output of the generator. This, in turn, will effect the torque applied to the drive wheels of the locomotive. A feedback signal of the field current is sent from the plant dynamics 16 to the field current controller 14. Additionally, a feedback signal of the generator voltage and current is sent from the plant dynamics 16 to the generator controller 12. As will be discussed in detail below, the generator controller 12 also receives an input signal from a fuzzy logic slip controller 18 such that the generator controller 12 uses all of the above mentioned input signals to determine the appropriate field current reference signal. The specific components and operation of the generator controller 12, the field current controller 14 and the plant dynamics 16 are common in typical locomotives, and are well known to one skilled in the art.

As discussed above, wheel slip ($\lambda$) can be controlled by changing the torque of the traction motors driving the drive wheels. Further, the torque generated by a series wound DC motor, as are the traction motors, is approximately proportional to the motor current. Hence, by adjusting the motor current, the wheel slip $\lambda$ can be controlled. The fuzzy slip controller 18 provides a generator current reference signal to the generator controller 12 so as to cause the generator controller 12 to adjust the generator output to change the wheel torque, and thus, control the wheel slip $\lambda$. The fuzzy logic slip controller 18 will set the motor current to provide a predetermined reference wheel slip $\lambda$, for example 5% wheel slip, regardless of the rail condition. The fuzzy slip controller 18 receives drive wheel speed, ground speed and motor current signals from the plant dynamics 16 in order to determine the appropriate generator current reference signal for the desirable wheel slip $\lambda$.

Additionally, the fuzzy slip controller 18 receives a slip reference ($\lambda_{reference}$) signal from a fuzzy logic slip reference estimator 20. The fuzzy logic slip reference estimator 20 also receives the wheel speed, ground speed and motor current signals from the plant dynamics 16 in order to determine the rail conditions so as to generate the slip reference $\lambda_{reference}$ signal that will cause the fuzzy slip controller 18 to adjust the generator current reference signal to provide the appropriate slip for a maximum coefficient of friction. The architecture of the fuzzy slip controller 18 and the fuzzy slip reference estimator 20 is common to many types of fuzzy logic controllers known in the art such as a proportional integral (PI) controller. For a detailed discussion of fuzzy logic controllers, one can see C. Lee, "Fuzzy Logic in Control Systems: Fuzzy Logic Controller—Parts I and II", IEEE Transactions on Systems, Man and Cybernetics, March/April 1990, pp. 404–435. The discussion below concerning the use of fuzzy logic to control wheel slip of locomotive drive wheels is based on a thesis paper by L. B. Jordan, Jr., "Locomotive Traction Control System Using Fuzzy Logic," Rensselaer Polytechnic Institute, Troy, New York, 1992.

Figure 3:
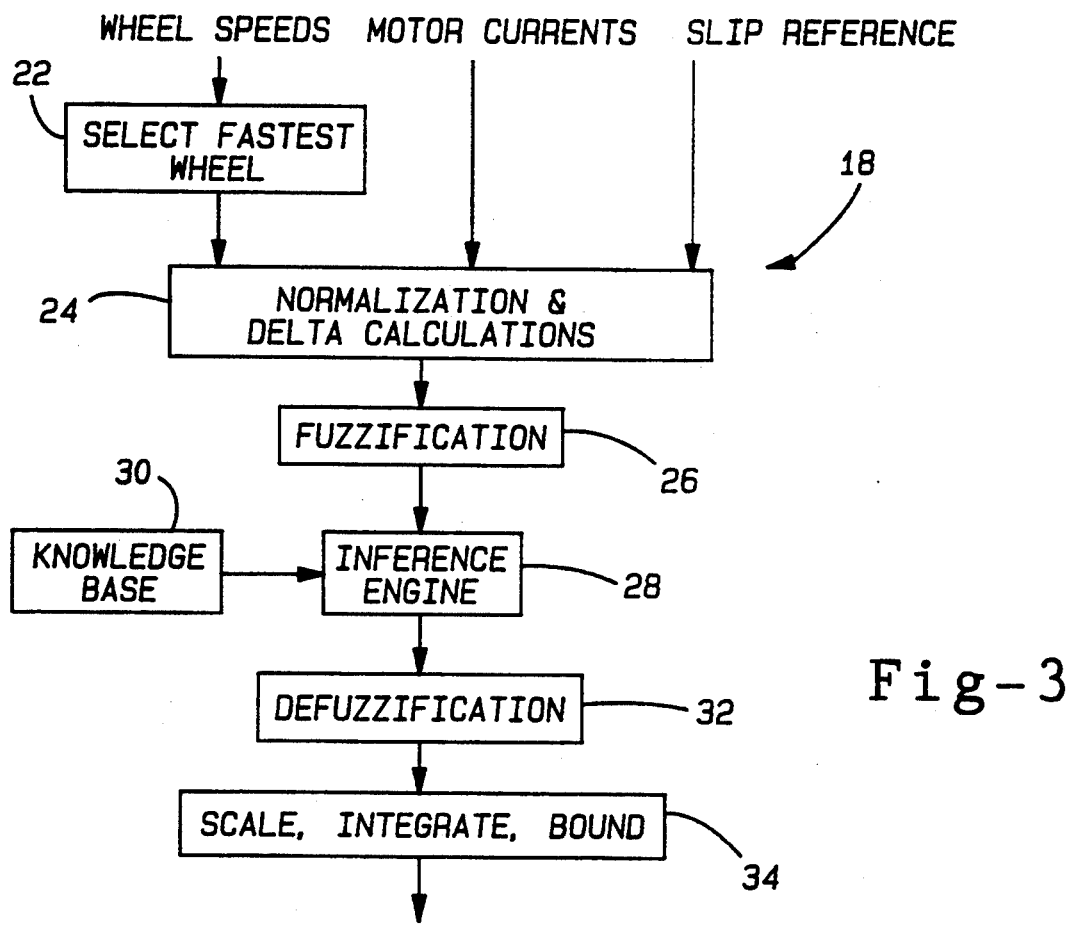
FIG. 3 is a block diagram of the fuzzy logic slip controller of the locomotive traction control system of FIG. 1.

Now turning to FIG. 3, a detailed block diagram of the fuzzy slip controller 18 is shown. As mentioned above, all of the traction motors of the locomotive are connected in parallel to the generator. This configuration requires that only one of the motor currents is controllable at any given time. The traction motor for which the current is being controlled is referred to as the target motor. Since having a wheel speed above the wheel slip reference $\lambda_{reference}$ is more serious than a wheel speed below the wheel slip reference $\lambda_{reference}$ due to the fact that it is undesirable to operate in the unstable region of the friction/slip relationship, the wheel with the largest amount of slip is designated the target motor. Therefore, the wheel speeds for all of the drive wheels are applied to a system 22 which selects the drive wheel with the fastest spin.

Next, a system 24 is incorporated for determining and normalizing delta calculations. The wheel speed of the fastest wheel from the system 22, each of the traction motor currents and the slip reference $\lambda_{reference}$ signal from the slip reference estimator 20 are applied as inputs to the system 24. The system 24 determines a raw wheel slip error ($\lambda_{error}$) as the difference between the actual wheel slip $\lambda$ and the slip reference $\lambda_{reference}$, a raw change in motor current ($\Delta I_{motor}$) between subsequent sampling times, and a raw change in wheel slip $\Delta \lambda$ between the current wheel slip $\lambda$ and the wheel slip at a previous sample time. These values are determined as follows:

$$\text{raw } \lambda_{error} = \lambda - \lambda_{reference} \quad (1)$$

$$\text{raw } \Delta I_{motor} = I_{motor}(k) - I_{motor}(k-1) \quad (2)$$

$$\text{raw } \Delta \lambda \lambda(k) - \lambda(k-1) \quad (3)$$

In these equations, k represents a present sample time and k−1 represents a previous sample time.

After the raw data has been calculated, these values are normalized and bounded so they lie between the values of −1.0 and 1.0 appropriate for fuzzification.

The system 24 determines the normalized values as follows:

$$\lambda_{error} = \begin{cases} 1.0 & K_1 \text{raw} \lambda_{error} > 1.0 \\ K_1 \text{raw} \lambda_{error} & -1.0 < K_1 \text{raw} \lambda_{error} < 1.0 \\ -1.0 & K_1 \text{raw} \lambda_{error} < -1.0 \end{cases} \quad (4)$$

$$\Delta \lambda = \begin{cases} 1.0 & K_2 \text{raw} \Delta \lambda > 1.0 \\ K_2 \text{raw} \Delta \lambda & -1.0 < K_2 \text{raw} \Delta \lambda < 1.0 \\ -1.0 & K_2 \text{raw} \Delta \lambda < -1.0 \end{cases} \quad (5)$$

$$\Delta I_{motor} = \begin{cases} 1.0 & K_3 \text{raw} \Delta I_{motor} > 1.0 \\ K_3 \text{raw} \Delta I_{motor} & -1.0 < K_3 \text{raw} \Delta I_{motor} < 1.0 \\ -1.0 & K_3 \text{raw} \Delta I_{motor} < -1.0 \end{cases} \quad (6)$$

$K_1$, $K_2$ and $K_3$ are predetermined normalization scaling factors or gain constants selected depending on the system models of the particular locomotive.

As mentioned above, the motor current $I_{motor}$ is proportional to motor torque. If the friction/slip relationship is in the stable region, the wheel slip $\lambda$ rate of change and the motor current $I_{motor}$ rate of change will have the same sign. If the friction/slip relationship is near the peak, a large change in the wheel slip A will result in a proportionally smaller change in the motor current $I_{motor}$. If the unstable region is entered, the rate of change of the wheel slip $\lambda$ and the motor current $I_{motor}$ will have opposite signs. Therefore, it is necessary to determine which of the three regions of peak, stable or unstable the system is operating.

In order to determine which of the three regions the system is operating in, a measure of stability (a) is calculated as follows:

$$\text{raw} \sigma = |\Delta I_{motor} - \Delta \lambda| [\text{sign}(\Delta I_{motor} \Delta \lambda)] \quad (7)$$

The raw $\sigma$ is then normalized for fuzzification as follows:

$$\sigma = \begin{cases} 1.0 & \text{raw } \sigma > 1.0 \\ \sigma & -1.0 < \text{raw } \sigma < 1.0 \\ -1.0 & \text{raw } \sigma < 1.0 \end{cases} \quad (8)$$

The stability $\sigma$ will be negative when the wheel slip $\lambda$ and the motor current $I_{motor}$ are changing in opposite directions, positive when these values are changing at different rates but in the same direction, and zero when these values are changing at the same rate. The larger the magnitude of the absolute difference between $\Delta I_{motor}$ and $\Delta \lambda$ becomes, the more accurately the region of operation can be determined.

Figure 4:
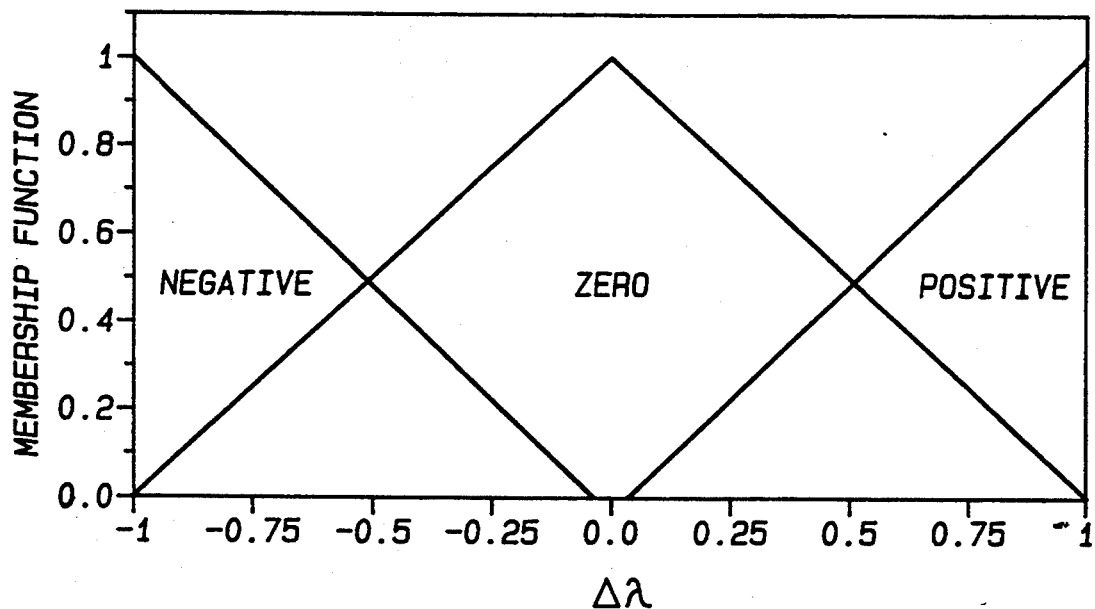
FIGS. 4–6 are graphs of the membership function sets for change in wheel slip, stability and wheel slip error, respectfully.
Figure 5:
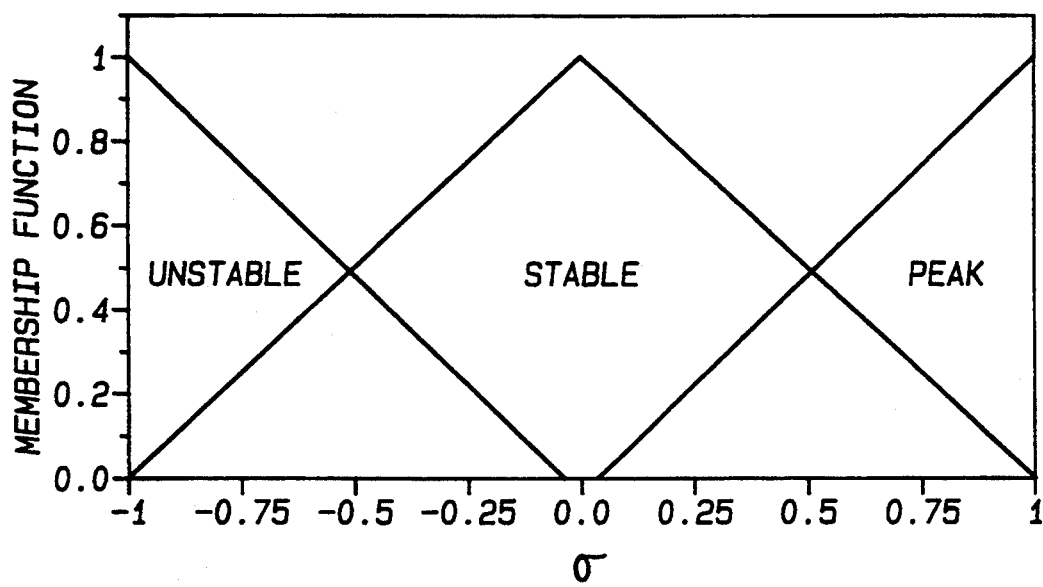
Figure 6:
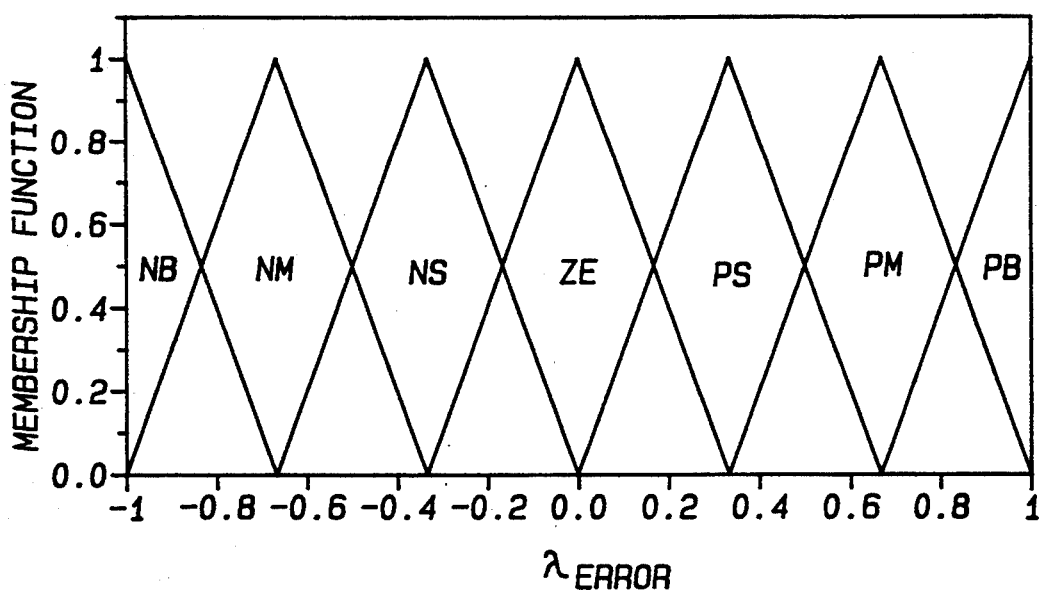

The normalized wheel slip error $\lambda_{error}$, change in wheel slip $\Delta \lambda$ and the stability $\sigma$ are next fuzzified by a fuzzification system 26. Each of $\Delta \lambda$, $\lambda_{error}$ and $\sigma$ are represented by a membership function set for fuzzification. A membership function is a real number classification of a linguistic description. In other words, a real number value is defined for each descriptive change in wheel slip $\Delta \lambda$, the slip error $\lambda_{error}$ and the stability $\sigma$. The use of membership functions to define a description is well understood in fuzzy logic applications. FIGS. 4–6 show membership function sets for each of the change in the wheel slip $\Delta\lambda$, the stability $\sigma$, and the slip error $\lambda_{error}$, respectfully. Membership function values are given on the vertical axis and the normalized values for $\Delta\lambda$, $\sigma$, or $\lambda_{error}$ are given on the horizontal axis.

The membership function set for $\Delta\lambda$ is selected to be negative, zero, and positive, as shown in FIG. 4. A small membership function set is chosen because the $\Delta\lambda$ calculations are susceptible to system noise and higher order system characteristics. For this reason, the membership function set for $\Delta\lambda$ provides a significant overlap between each of the members in the set. A small amount of overlapping between the membership functions causes undesirable abrupt changes in the output of the controller 18.

The zero membership function is defined as the area beneath a triangle which begins at the $-1.0$ location on the $\Delta\lambda$ axis, reaches a peak at the 1.0 membership function value above 0.0 $\Delta\lambda$, and descends to the 1.0 location on the $\Delta\lambda$ axis. The negative membership function is defined as the area beneath a line that extends from the 1.0 membership function value to approximately the 0.0 location on the $\Delta\lambda$ axis. The positive membership function is defined as the area beneath a line that extends positively approximately from the 0.0 location on the $\Delta\lambda$ axis upward to the 1.0 membership function value.

To determine the membership function value for a particular $\Delta\lambda$, the normalized $\Delta\lambda$ value is first determined from equations (3) and (5), and is located on the horizontal axis in FIG. 4. A vertical line is extended upward from this location to determine an intersection between this line and the membership function lines. By extending a horizontal line from the intersection between the vertical line and the membership function lines to the vertical axis establishes the membership function values for the particular $\Delta\lambda$ value. For example, say that the $\Delta\lambda$ value calculated from equation (5) was found to be $-0.25$. By extending a vertical line upward from the $-0.25$ location on the $\Delta\lambda$ axis of the graph of FIG. 4, an intersection with the negative membership function line occurs at approximately 0.25, and an intersection with the zero membership function line occurs at approximately 0.75. Therefore, these are the membership function values for this particular change in wheel slip $\lambda$.

The membership function set for stability $\sigma$ is the same as the membership function set for the change in wheel slip $\Delta\lambda$ except that the membership functions are labeled unstable, stable and peak instead of negative, zero and positive, respectfully, as shown in FIG. 5. The stability $\sigma$ is determined by equations (7) and (8), and the appropriate membership function values are determined from this stability value in FIG. 5 in the same manner as discussed above for the $\Delta\lambda$ membership function values.

The membership function set for the slip error $\lambda_{error}$ consists of seven membership functions, as shown in FIG. 6. Each of the seven membership functions is labeled as one of negative big (NB), negative medium (NM), negative small (NS), zero even (ZE), positive small (PS), positive medium (PM), and positive big (PB). By this notation, the value for NB is a relatively big negative number, the value for NM is a relatively medium negative number, the value for NS is a relatively small negative number, the value for ZE is exactly zero, the value for PS is a relatively small positive number, the value for PM is a relatively medium positive number, and the value for PB is a relatively large positive number. The quality of the error signal is sufficient to support the seven membership functions.

The NB membership function is defined as the area beneath the line which starts at the 1.0 membership function value and intersects the $\lambda_{error}$ axis at approximately $-0.7$. The NM membership function is defined as the area beneath the triangle which starts as the $-1.0$ $\lambda_{error}$ value, reaches a peak at approximately the $-0.7$ $\lambda_{error}$ value, and descends to approximately the $\lambda_{error}$ $-0.3$ value. The NS membership function is defined as the area beneath the triangle that starts at the $-0.7$ $\lambda_{error}$ value, reaches a peak at approximately the $-0.5$ $\lambda_{error}$ value, and descends to approximately the 0.0 $\lambda_{error}$ value. The ZE membership function is defined as the area beneath the triangle that starts at the $-0.5$ $\lambda_{error}$ value, reaches a peak at approximately the 0.0 $\lambda_{error}$ value and descends to approximately the 0.3 $\lambda_{error}$ value. The PS membership function is defined as the area beneath the triangle that starts at the 0.0 $\lambda_{error}$ value, reaches a peak at approximately the 0.3 $\lambda_{error}$ value and descends to the 0.7 $\lambda_{error}$ value. The PM membership function is defined as the area beneath the triangle that starts at the 0.3 $\lambda_{error}$ value, reaches a peak at the 0.7 $\lambda_{error}$ value and descends to the 1.0 $\lambda_{error}$ value. And finally, the PB membership function set is defined as a line that extends from the 0.7 $\lambda_{error}$ value to the 1.0 membership function value. By using equation (4), a normalized value for $\lambda_{error}$ is calculated and the membership function values are determined from the graph of FIG. 6 in the manner as discussed above.

Once the membership function values are determined from the fuzzification system 26 for each of the wheel slip error $\lambda_{error}$, change in the wheel slip $\Delta\lambda$ and stability $\sigma$, these values are applied to an inference engine 28. Additionally, an output from a knowledge base 30 is also applied to the inference engine 28. It is noted that the fuzzified slip error $\lambda_{error}$ and the fuzzified delta slip $\Delta\lambda$ could be used as the inputs to a standard fuzzy PI knowledge base to a formslip controller. However, the design objective is to create a controller that is robust enough to handle the control of the system when it is operating in the unstable region of the friction/slip relationship. The addition of the change in the target motor current $\Delta I_{motor}$ allows the measure of stability $\sigma$ to be calculated which provides additional information that can be incorporated into the knowledge base 30. The additional stability information can be used to provide the desirable robustness.

The slip controller 18 can be thought of as a meta-controller with three low-level controllers. Particularly, one low-level controller is assigned for each region of the friction/slip relationship designated as the peak, stable and unstable regions. Each low-level controller would then produce an output and the three outputs would be combined by the meta-controller depending on the measure of stability. Table I shows how the appropriate outputs are determined depending on the region of operation. In Table I, outputs are selected by taking the appropriate change in wheel slip $\Delta\lambda$ as positive, zero or negative, and the slip error $\lambda_{error}$ as one of the seven membership functions PB, PM, PS, ZE, NS, NM and NB for each region of stability.

TABLE I

| $\Delta\lambda$ | $\sigma$ is PEAK | | | $\sigma$ is STABLE | | | $\sigma$ is UNSTABLE | | |
|---|---|---|---|---|---|---|---|---|---|
| $\lambda_{error}$ | Positive | Zero | Negative | Positive | Zero | Negative | Positive | Zero | Negative |
| PB | NB (1) | NB (2) | NS (3) | NM (4) | NM (5) | NZ (6) | NB (7) | NM (8) | NM (9) |
| PM | NB (10) | NM (11) | NZ (12) | NM (13) | NS (14) | ZE (15) | NB (16) | NM (17) | NM (18) |
| PS | NB (19) | NS (20) | ZE (21) | NM (22) | NZ (23) | PZ (24) | NB (25) | NM (26) | NM (27) |
| ZE | NM (28) | NZ (29) | PZ (30) | NS (31) | ZE (32) | PS (33) | NB (34) | NM (35) | NM (36) |
| NS | NS (37) | ZE (38) | PS (39) | NZ (40) | PZ (41) | PM (42) | NM (43) | NM (44) | NS (45) |
| NM | NZ (46) | PZ (47) | PS (48) | ZE (49) | PS (50) | PM (51) | NM (52) | NM (53) | NS (54) |
| NB | ZE (55) | PS (56) | PS (57) | PZ (58) | PM (59) | PM (60) | NS (61) | NS (62) | NS (63) |

When the system is operating in the peak region of the friction/slip relationship, as determined by equations (7) and (8), a small change in the motor current $I_{motor}$ results in a large change in the wheel slip $\lambda$. Near the peak, extra caution must be taken to avoid going into the unstable region. In a case where the slip error $\lambda_{error}$ is negative, the control action taken to drive the error to zero should be less aggressive than that of a standard fuzzy PI controller. On the other hand, when the slip error $\lambda_{error}$ is positive, the control action should be more aggressive at approaching the slip reference. Lingering around the peak is undesirable since the unstable region could be entered if the system experiences a small disturbance. Therefore, if the stability $\sigma$ is determined to have a membership function for the peak region of the friction/slip relationship, the peak region meta-controller knowledge base 30 is used given by:

If $\sigma$ is at the peak, then use the modified fuzzy PI knowledge base to determine the controller output.

The modified PI controller knowledge base is shown in the first section of Table I labeled as "$\sigma$ is Peak".

If the system has a membership function in the stable region of the friction/slip relationship, as determined by equations (7) and (8), a standard fuzzy PI knowledge base is used, and the output of the knowledge base 30 is determined by:

If $\sigma$ is stable, then use the standard fuzzy PI knowledge base to determine the controller output.

The standard PI controller knowledge base is shown as the second section of Table I labeled as "$\sigma$ is Stable".

If the friction/slip relationship is operating in the unstable region, as determined by equations (7) and (8), it is undesirable regardless of the slip error $\lambda_{error}$. Under these circumstances, the controller 18 must take recovery actions in order to damp out oscillations and return to the stable region of the friction/slip relationship. A wheel slip $\lambda$ decreasing in the unstable region implies that the wheel slip $\lambda$ is in the negative part of an oscillation. If this is the case, the goal is to steady the target motor current. The generator current must be reduced in order to stop the traction motor current from rising. The control action does not need to be as severe because the wheel slip $\lambda$ is decreasing. If the wheel slip $\lambda$ is increasing in the unstable region, this implies that the wheel slip $\lambda$ is in the positive part of an oscillation. In this region, excessive wheel slip can cause physical damage, and therefore a large control action must be made to limit the wheel slip $\lambda$. If the stability $\sigma$ is determined to have a membership function for the unstable region of the friction/slip relationship, the unstable meta-controller knowledge base 30 is used as given by:

If $\sigma$ is unstable, then use the unstable region of the knowledge base to determine the controller output.

The knowledge base for the unstable region is shown in the third section of Table I labeled as "$\sigma$ is unstable".

Note that the knowledge base 30 of Table I consists of rules numbered from 1 to 63, where each rule has three predicates. Each rule is labeled according to the notation of the membership function set of FIG. 6. Two additional rules are defined as positive zero (PZ) and negative zero (NZ) having values slightly more and slightly less than zero, respectively. The inference engine 28 determines and outputs the degree of applicability ($\beta$) for each of the 63 rules. The degree of applicability $\beta$ is defined as the minimum membership function value for each rule of Table I.

In order to set forth how the degree of applicability $\beta$ for each rule is determined, an example will be put forward. Assume that the $\Delta\lambda$ value is found to be $-0.25$, the stability $\sigma$ is found to be 0.25, and the $\lambda_{error}$ value is found to be 0.2 in the manner as discussed above. Then, looking at FIG. 4 for $\Delta\lambda$, it is found that the membership function value for the zero membership function is 0.25 and the membership function value for the negative membership function is 0.75. Looking at FIG. 5 for $\sigma$, it is found that the membership function value for the peak membership function is 0.25 and the membership function value for the stable membership function is 0.75. Then looking at FIG. 6 for $\lambda_{error}$, it is found that the membership function values for the PS and ZE membership functions are 0.5. Going to Table I, we find the applicable rule for the $\Delta\lambda$ and $\lambda_{error}$ values for the Peak and Stable stability sections. Particularly, from these values, we see that Rules 20, 21, 23, 24, 29, 30, 32 and 33 are applicable for these values of $\Delta\lambda$, $\lambda_{error}$ and $\sigma$. The inference engine 28 will then determine the degree of applicability $\beta$ by taking the minimum of the three membership function values for each of these rules. For example, the minimum membership function value for Rule 20 is selected from the values $\lambda_{error}(PS)=0.5$, $\Delta\lambda(zero)=0.25$ and $\sigma(peak)=0.25$. The $\beta$ values for Rules 20, 21, 23, 24, 29, 30, 32 and 33 are therefore 0.25, 0.25, 0.25, 0.5, 0.25, 0.25, 0.25 and 0.5, respectively. The $\beta$ values for the remaining rules are all zero.

Examination of the input membership function sets of FIGS. 4–6 reveal that no more than two membership function values can have a non-zero fuzzy value for a given input. As a result, no more than eight rules have a non-zero degree of applicability at any given time. When a rule has a non-zero degree of applicability, it is referred to as being "fired".

Once the inference engine 28 determines the appropriate $\beta$ output values for each rule of Table I, these values are applied to a defuzzification system 32. A height defuzzification method is used by this system. The height method of defuzzification is a well known procedure that determines a weighted average of an output membership function's center of gravity. A weighting function for each rule is its corresponding degree of applicability $\beta$.

A normalized output, $\Delta\mu$, of the defuzzification system 32 using the height method is determined by:

$$\Delta \mu = \frac{\sum_{i=1}^{m} \beta_i C_i}{\sum_{i=1}^{m} \beta_i} \quad (9)$$

Figure 7:
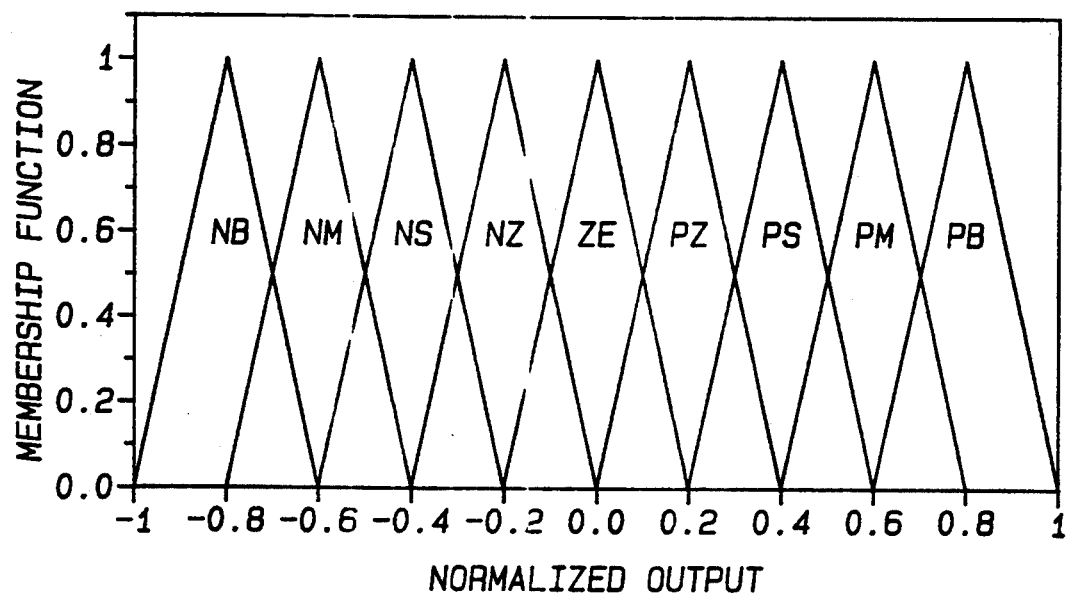
FIG. 7 is a graph of the membership function set for a defuzzification step of the fuzzy logic slip controller of FIG. 3.

In equation (9), $C_i$ is the midpoint value for each rule that has been fired as determined by an output membership function set consisting of nine equally spaced and symmetric membership functions shown in FIG. 7. These membership functions include NB, NM, NS, NZ, ZE, PZ, PS, PM and PB, mentioned above, arranged in symmetrical triangles as shown. The value m is 63 for each of the rules of Table I. A standard fuzzy PI uses seven different outputs. The two additional membership functions (PZ, NZ) were added so that exaggerated control actions could be taken under the special conditions discussed earlier in the unstable region. The symmetric quality of each output membership function causes its center of gravity to be unchanged as it is clipped or scaled. The constant center of gravity simplifies the defuzzification process.

Returning to the example above, it can be seen that Rule 20 is NS, Rule 21 is ZE, Rule 23 is NZ, Rule 24 is PZ, Rule 29 is NZ, Rule 30 is PZ, Rule 32 is ZE, and Rule 33 is PS. By finding each of these membership functions in FIG. 7, we determine $C_i$ to be the peak of each of the triangles of the function for the particular rule. For example, for Rule 20, $\beta$ will be 0.25 and, from FIG. 7, $C_i$ will be $-0.4$. $C_i$ is determined from FIG. 7 for each of the applicable rules in this manner.

The output of the defuzzification system 32, $\Delta u$, is scaled and integrated to determine the generator current reference signal ($I_{gr}$), as depicted by a scale, integrate and bound system 34. The generator current reference signal $I_{gr}$ is given as:

$$I_{gr} = I_{gr-1} + \Delta \mu K_4 \quad (10)$$

where $K_4$ is a gain constant and $I_{gr-1}$ is a generator current reference signal from the previous sample time.

The generator may not be able to develop the amount of current desired. To avoid integral wind-up, the integrator for the generator current reference signal should be adjusted under these special conditions. When the generator current reference signal is above the maximum generator current, the generator current reference signal should be limited to the maximum generator current. When the generator is operating at its voltage or power limit, the slip controller 18 is ignored and becomes an open loop. When this occurs, the generator current reference signal should be set to the actual generator current being measured.

The ideal sampling time of the slip controller 18 is 20 ms because existing generator controllers operate at a cycle time of this value. If the slip controller 18 were to operate at a faster rate than the generator controller 12, this would result in useless intermediate calculations by the slip controller 18. The slip controller 18 could be operated at a slower rate resulting in an inferior transient response. The choice of a sampling rate for a fuzzy logic controller is subject to the same considerations that determine the sampling rate for a standard discrete controller.

The performance characteristics of the slip controller 18 can be adjusted by changing the normalization gain constants $K_1$, $K_2$, $K_3$ and $K_4$. Ideally, the slip error $\lambda_{error}$ normalization gain constant factor $K_1$ of equation (4) should be set so that zero slip always corresponds to a normalized slip error of $-1.0$. Therefore, the slip error normalization gain constant $K_1$ is defined as:

$$K_1 = \frac{1}{\lambda_{reference}} \quad (11)$$

Adjusting the slip error normalization gain constant $K_1$ as the slip reference $\lambda_{reference}$ changes deemphasizes the slip error $\lambda_{error}$ as the slip reference $\lambda_{reference}$ increases. This in turn causes the slip controller 18 to become less aggressive at approaching zero slip error $\lambda_{error}$ as the slip reference $\lambda_{reference}$ increases. It is desirable to approach high levels of slip more cautiously because the consequences of exceeding the peak of the friction/slip relationship becomes more severe at higher levels of wheel slip $\lambda$.

The change in the wheel slip $\Delta \lambda$ normalization gain constant $K_2$ of equation (5) is set so that the wheel slip $\lambda$ is very small when the system is near steady state, and is $\pm 1.0$ during uncontrolled wheel slips. The change in the motor current normalization gain constant $K_3$ of equation (6) is then set so that $\Delta \lambda$ is approximately equal to $\Delta I_{motor}$ when the system is well within the stable region of the friction/slip relationship. If these two gain controls were not set in this way, the logic of the knowledge base 30 would become less effective.

The output gain constant $K_4$ of equation (10) is set by balancing several factors. Because the output of the slip controller 18 is the input to the generator controller 12, the slip controller 18 output should not contain frequencies outside the bandwidth of the generator controller 12. Too large of a gain constant could cause this condition to exist. A large gain constant could also cause excessive control action to occur in response to steady state noise. On the other hand, if the gain constant is too low, the control action will not be sufficient to adequately control the slip. Based on these factors, a middle ground for the output gain constant $K_4$ is desirable.

The slip controller 18 is designed to minimize the effects of slip reference signals that are in the unstable region of the friction/slip relationship. The slip controller 18 attenuates the oscillations that would normally occur in the unstable region. The slip controller 18 does not prevent entry into the unstable region, but does recognize entry into this region and uses appropriate control actions to mitigate the otherwise unfavorable response. The slip reference estimator 20 determines the operating region just as the slip controller 18 does. By using the measure of stability $\sigma$, the slip error $\lambda_{error}$ and the change in wheel slip $\Delta \lambda$, the slip reference estimator 20 determines how the slip reference $\lambda_{reference}$ should be changed to maximize the coefficient of friction.

The slip reference estimator 20 uses the same variables, gain constants and membership functions as discussed above for the slip controller 18. Specifically, the values of $\lambda_{error}$, $I_{motor}$, $\Delta \lambda$, and $\sigma$ as well as the gain constants $K_1$-$K_4$, are identical for the slip reference estimator 20 as they were for the slip controller 18. The slip reference estimator 20 will incorporate a normalization system, a fuzzification system, an inference engine, a defuzzification system, and a scaling system that are the same as above for the slip controller 18. However, the knowledge base that the slip reference estimator 20 uses is different than the knowledge base of the controller 18. Because the process of determining the slip reference $\lambda_{reference}$ by the slip reference estimator 20 is the same as the process of determining the generator current reference signal by the slip controller 18, except for the use of a different knowledge base, a detailed block diagram of the slip reference estimator would be the same as FIG. 3, and thus, a block diagram of the slip reference estimator 20 is not shown. One can refer to the discussion above concerning fuzzification of the change in wheel slip $\Delta\lambda$, the stability $\sigma$ and the wheel slip error $\lambda_{error}$. The discussion below of the slip reference estimator 20 will go directly to the knowledge base. The slip reference estimator 20 can be thought of as a meta-estimator with three low-level estimators, just as with the controller 18. The meta-estimator knowledge base for the slip reference estimator 20 is given in Table II below. Table II also includes 63 rules, each rule having three predicates.

TABLE II

| $\Delta\lambda$ | $\sigma$ is PEAK | | | $\sigma$ is STABLE | | | $\sigma$ is UNSTABLE | | |
|---|---|---|---|---|---|---|---|---|---|
| $\lambda_{error}$ | Positive | Zero | Negative | Positive | Zero | Negative | Positive | Zero | Negative |
| PB | ZE (1) | ZE (2) | ZE (3) | ZE (4) | PM (5) | ZE (6) | ZE (7) | ZE (8) | ZE (9) |
| PM | ZE (10) | ZE (11) | ZE (12) | ZE (13) | PM (14) | ZE (15) | NZ (16) | NZ (17) | NZ (18) |
| PS | ZE (19) | ZE (20) | ZE (21) | ZE (22) | PS (23) | ZE (24) | NS (25) | NS (26) | NS (27) |
| ZE | ZE (28) | ZE (29) | ZE (30) | ZE (31) | ZE (32) | ZE (33) | NM (34) | NM (35) | NM (36) |
| NS | ZE (37) | ZE (38) | ZE (39) | ZE (40) | ZE (41) | ZE (42) | NB (43) | NB (44) | NB (45) |
| NM | NZ (46) | NZ (47) | NZ (48) | ZE (49) | ZE (50) | ZE (51) | NB (52) | NB (53) | NB (54) |
| NB | NS (55) | NS (56) | NS (57) | ZE (58) | ZE (59) | ZE (60) | NB (61) | NB (62) | NB (63) |

Figure 8:
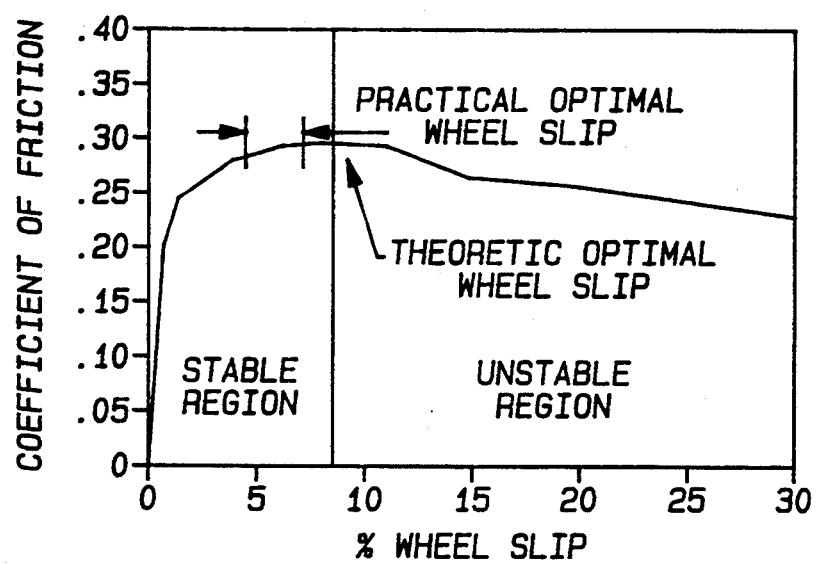
FIG. 8 is a more detailed graph showing the relationship between the percent of wheel slip for the slip reference on the horizontal axis and the coefficient of friction on the vertical axis.

FIG. 8 shows a more detailed graphical depiction of the percent wheel slip and the coefficient of friction setting out the stable, peak and unstable regions. When the system is operating in the peak region it is precariously close to the theoretical optimal wheel slip $\lambda^*$. Under conditions when the slip error $\lambda_{error}$ is positive, the controller 18 will attempt to drive the system to steady state, thus reducing the wheel slip error $\lambda_{error}$. If the system is operating near the peak region as the slip error $\lambda_{error}$ is being reduced, the system will become more stable by traversing deeper into the stable region. Under these conditions, the system is not in danger of becoming unstable and the slip reference $\lambda_{reference}$ does not require lowering. An increase in the slip reference $\lambda_{reference}$ might be possible, but that adjustment should be made by the stable estimator knowledge base (discussed below) after the system has transitioned.

When the system is operating in the peak region and the slip error $\lambda_{error}$ is negative, the controller 18 will continue increasing the slip $\lambda$ in order to reach the stable region of operation. Increasing the slip $\lambda$ when the system is already operating in the peak region, would likely cause the unstable region to be entered. In order to avoid this situation, the wheel slip reference $\lambda_{reference}$ is adjusted downward according to the magnitude of the wheel slip error $\lambda_{error}$. The more negative the error is, the more the slip reference $\lambda_{reference}$ is reduced. If the stability $\sigma$ is determined to have a membership function for the peak region of the friction/slip relationship, the peak region meta-estimator knowledge base is used as given by:

If $\sigma$ is peak, then use the peak region estimator knowledge base to determine the controller output.

This peak region estimator knowledge base is shown in the first section of Table II labeled as "$\sigma$ is Peak".

When the system is operating in the stable region, the wheel slip $\lambda$ is less than the optimum wheel slip $\lambda^*$. However, just because the wheel slip $\lambda$ is in the stable region does not necessarily mean that the wheel slip reference $\lambda_{reference}$ is in the stable region. Further, if the slip error $\lambda_{error}$ is positive, then the slip reference $\lambda_{reference}$ should be in the stable region. Under these conditions, the slip reference $\lambda_{reference}$ could be raised because the system is operating in the stable region at a level of slip greater than the present slip reference $\lambda_{reference}$. Upward adjustment of the slip reference $\lambda_{reference}$ should only be made when the system is close to steady state. This additional restriction is conservative, but if an upward revision is warranted, it will remain as the system nears steady state.

The wheel slip reference $\lambda_{reference}$ should never be increased if the slip error $\lambda_{error}$ is negative. The slip error membership function "ZE" is non-zero for small and negative slip errors. Therefore, the wheel slip reference $\lambda_{reference}$ should not be increased when the slip error is "ZE" but should be increased when the slip error is truly positive (PS, PM, PB). When the slip error $\lambda_{error}$ is slightly positive and the change in wheel slip and motor current $I_{motor}$ is very small, Rules (8) and (11) of Table II will fire. If the slip error $\lambda_{error}$ is very close to zero, Rule (11) will dominate, and the slip reference $\lambda_{reference}$ will increase slightly. In order to cause a larger increase in the slip reference $\lambda_{reference}$ under this condition, the output of Rule (8) is PS. Under steady state conditions, only fires under Rule (11) cause the wheel slip reference $\lambda_{reference}$ to remain unchanged. This may seem inconsistent, but since the estimator has not explored the stability of a higher level of slip, it cannot raise the slip reference $\lambda_{reference}$. Also, steady state could be reached in any of the regions of the friction/slip relationship. However, the stability of the origin changes with the region of the friction/slip relationship. If the system reaches steady state in the stable region, then the steady state condition is stable. A disturbance from this condition is required to cause the slip reference $\lambda_{reference}$ to be modified, therefore, persistence of an excitation must be present in the system. The actual system is subject to continual disturbances such that persistence of excitation can essentially be guaranteed. The persistence of excitation requirement is a common occurrence in adaptive control design. If the stability $\sigma$ is determined to have a membership function for the stable region of the friction/slip relationship, the stable region meta-estimator knowledge base which provides these design criteria is given by:

If $\sigma$ is stable, then use the stable region estimator knowledge base to determine the estimators change in output.

The stable region estimator knowledge base is shown in the second section of Table II labeled as "$\sigma$ is Stable".

When the system is operating in the unstable region, it is critical to assure that the wheel slip reference $\lambda_{reference}$ is adjusted lower so that it is in the stable region. Although the slip controller 18 can prevent large oscillations from occurring while the system is in the unstable region, operating in the unstable region causes some oscillation. The speed of the slip reference $\lambda_{reference}$ reduction depends on the wheel slip error $\lambda_{error}$. Operation in the unstable region while the slip λ is below the reference means the slip reference $\lambda_{reference}$ is much too high and should be reduced quickly. If the slip is close to or above the slip reference $\lambda_{reference}$, the slip reference $\lambda_{reference}$ should be adjusted downward more slowly. If the stability $\sigma$ is determined to have a membership function for the unstable region of the friction/slip relationship, the unstable region meta-estimator knowledge base is given by:

If $\sigma$ is unstable, then use an unstable region estimator knowledge base to determine the controller output.

The unstable region estimator knowledge base is shown in the third section of Table II labeled as "$\sigma$ is Unstable".

The output of the slip reference estimator inference engine is a fuzzy set representing the change to the slip reference $\lambda_{reference}$ that should be made. The fuzzy output is defuzzified using the height method as discussed above for the output of the slip controller 18 in order to arrive at the $\lambda_{reference}$ value.

Under a few rail conditions, the friction/slip relationship never reaches a peak and therefore does not have an unstable region. However, high levels of wheel slip λ may theoretically provide more traction, but wear on the rail and wheels become excessive. In most applications, the wheel slip reference $\lambda_{reference}$ should be limited so that it does not exceed 25% wheel slip. This limit is primarily based on economic factors and is therefore subject to modifications. The wheel slip reference $\lambda_{reference}$ is also subjected to a lower limit. The lower limit is primarily a factor of the accuracy of the actual sensors utilized by the system. Very small levels of slip are subject to calculation errors because the difference between the locomotive velocity and the wheel velocity is very small. In a preferred embodiment, the initial value for the lower limit of the slip reference $\lambda_{reference}$ should be set at 2% wheel slip. The output of the defuzzification system, Δ reference, is scaled and integrated to determine the new wheel slip reference $\lambda_{reference}$ defined as follows:

$$\lambda_{ref}(k+1) = \begin{cases} 25\% & \lambda_{ref}(k) + \Delta_{ref}K_5 > 25\% \\ \lambda_{ref}(k) + \Delta_{ref}K_5 & 2\% \%\lambda_{ref}(k) + \Delta_{ref}K_5 < 25\% \\ 2\% & \lambda_{ref}(k) + \Delta_{ref}K_5 < 2\% \end{cases} \quad (12)$$

where $K_5$ is a predetermined gain constant.

As mentioned above, the slip reference estimator's knowledge base is derived based on the same membership functions and normalization factors as the slip controller 18. This is done to simplify the overall system and provide for a more concrete tuning procedure. Before tuning the estimator 20, the slip controller 18 should be tuned with the estimator 20 deactivated and a constant slip reference $\lambda_{reference}$ used in its place. After satisfactory performance of the slip controller 18 is obtained, the slip estimator 20 can be activated. If $K_5$ is set too large, the estimator 20 will make large corrections when relative little can be inferred about the status of the system. Large changes in the slip reference $\lambda_{reference}$ will induce undesirable oscillations in the output of the system. A low gain constant $K_5$ will cause the estimator 20 to lag the system and to track the peak of the friction/slip relationship. All of the available tractive force will not be utilized when the slip reference $\lambda_{reference}$ is in the stable region and the estimator 20 reacts slowly. On the other hand, if the slip reference $\lambda_{reference}$ is in the unstable region and the estimator 20 corrects slowly, the slip controller 18 will provide a rough control until the reference re-enters the stable region.

The above-described fuzzy logic process to determine the appropriate wheel slip for maximum traction can be implemented in many ways. Specifically, it is possible to provide hardware control which performs the desired fuzzification and defuzzification steps. Additionally, it is possible to incorporate the fuzzification and defuzzification steps of the fuzzy slip controller 18 and the fuzzy slip reference estimator 20 as software steps. A specific software implementation of the above described process is shown in the paper by L. Jordan, Jr. referenced above and attached hereto as Appendix A.

It is noted that the above traction control apparatus and method are described for use as a traction control system in a locomotive. However, it is stressed that the same process can be applied to other traction control systems not associated with a locomotive in which it is desirable to maximize the coefficient of friction between drive wheels associated with a vehicle incorporating the traction control system and a drive surface.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

APPENDIX A- MATLAB FUNCTIONS

```
function [sys,x0] = slip_flc(t,x,u,flag)
% Simulate the Fuzzy Logic Traction Control System
%
% Inputs:
%    u(1) to u(6) : Wheel Slip
%    u(7) to u(12) : current
%
% States:
%    x(1) to x(6) : Previous Wheel Slip
%    x(7) to x(12) : Previous Motor Current
%    x(13) : Generator Current Reference
%    x(14) : Next Time of Execution
%    x(15) : norm_slip_delta
%    x(16) : norm_current_delta
%    x(17) : norm_slip_error
%    x(18) : delta_u
%    x(19) = slip reference estimate
%    x(20) = delta_estimate
%
```

APPENDIX A- MATLAB FUNCTIONS

```
% Outputs:
%   y(1) : Generator Current Reference
%   y(2) : norm_slip_delta
%   y(3) : norm_current_delta
%   y(4) : norm_slip_error
%   y(5) : delta_u
%   y(6) = slip reference estimate
%   y(7) = delta_estimate
%
%
% Update the States.
if abs(flag) == 2
    % Run the Control System if 20 ms have passed.
    if t>=x(14)
        % Find the highest slip.
        target_wheel = 1;
        target_wheel_slip = u(1);
        for i = 2:6,
            if u(i) > target_wheel_slip
                target_wheel = i;
                target_wheel_slip = u(i);
            end
        end
        % Normalize all the inputs
        slip_reference = x(19);
        norm_current_delta = max(-1,min(1,(u(target_wheel+6)-x(target_wheel+6))/ 10));
        norm_slip_delta = max(-1,min(1,(u(target_wheel)-x(target_wheel))/ 0.003));
        norm_slip_error = max(-1,min(1,(u(target_wheel)-slip_reference)/ slip_reference));
        stability_measure = abs(norm_current_delta-
                    norm_slip_delta)*sign(norm_current_delta*norm_slip_delta);
        stability_measure = max(-1,min(1,stability_measure));
        % Fuzzify the normalized current delta input
        stability_peak = Membership_Value(stability_measure,1.0,1.0,.98,0);
        stability_stable = Membership_Value(stability_measure,0,0,1.0,1.0);
        stability_unstable = Membership_Value(stability_measure,-1.0,-1.0,0,0.98);
        % Fuzzify the normalized slip delta input
        slip_delta_pos = Membership_Value(norm_slip_delta,1.0,1.0,.98,0);
        slip_delta_zero = Membership_Value(norm_slip_delta,0,0,1.0,1.0);
        slip_delta_neg = Membership_Value(norm_slip_delta,-1,-1.0,0,.98);
        % Fuzzify the slip error input
        slip_error_pos_big = Membership_Value(norm_slip_error,1.000,1.000,0.333,0.000);
        slip_error_pos_medium = Membership_Value(norm_slip_error,0.667,0.667,0.333,0.333);
        slip_error_pos_small = Membership_Value(norm_slip_error,0.333,0.333,0.333,0.333);
        slip_error_zero = Membership_Value(norm_slip_error,0.000,0.000,0.333,0.333);
        slip_error_neg_small = Membership_Value(norm_slip_error,-0.333,-
                    0.333,0.333,0.333);
        slip_error_neg_medium = Membership_Value(norm_slip_error,-0.667,-
                    0.667,0.333,0.333);
        slip_error_neg_big = Membership_Value(norm_slip_error,-1.000,-
                    1.000,0.000,0.333);
        % Zero the arrays
        w = zeros(7,9);
        y = zeros(7,9);
        z = zeros(7,9);
        % Fill the three 3D Matrixes of Fuzzy Values
        w(1,1:9) = ones(1,9)*slip_error_pos_big;
        w(2,1:9) = ones(1,9)*slip_error_pos_medium;
        w(3,1:9) = ones(1,9)*slip_error_pos_small;
        w(4,1:9) = ones(1,9)*slip_ezror_zero;
        w(5,1:9) = ones(1,9)*slip_error_neg_small;
        w(6,1:9) = ones(1,9)*slip_error_neg_medium;
        w(7,1:9) = ones(1,9)*slip_error_neg_big;
        y(1:7,1) = ones(7,1)*slip_delta_pos;
        y(1:7,2) = ones(7,1)*slip_delta_zero;
        y(1:7,3) = ones(7,1)*slip_delta_neg;
        y(1:7,4) = ones(7,1)*slip_delta_pos;
        y(1:7,5) = ones(7,1)*slip_delta_zero;
        y(1:7,6) = ones(7,1)*slip_delta_neg;
        y(1:7,7) = ones(7,1)*slip_delta_pos;
        y(1:7,8) = ones(7,1)*slip_delta_zero;
        y(1:7,9) = ones(7,1)*slip_delta_neg;
        z(1:7,1:3) = ones(7,3)*stability_peak;
        z(1:7,4:6) = ones(7,3)*stability_stable;
        z(1:7,7:9) = ones(7,3)*stability_unstable;
        % AND all the variables together to get a reference state match.
        result = min(w,y);
        result = min(result,z);
        % Set the center of gravities for the output sets.
        NB = -0.800;
        NM = -0.600;
        NS = -0.400;
```

-continued

APPENDIX A- MATLAB FUNCTIONS

```
    NZ = -0.200;
    ZE = 0;
    PZ = 0.200;
    PS = 0.400;
    PM = 0.600;
    PB = 0.800;
    % Knowledge Base in tabular format.
    KB = [
    NB,NB,NS,NM,NM,NZ,NB,NM,NM
    NB,NM,NZ,NM,NS,ZE,NB,NM,NM
    NB,NS,ZE,NM,NZ,PZ,NB,NM,NM
    NM,NZ,PZ,NS,ZE,PS,NB,NM,NM
    NS,ZE,PS,NZ,PZ,PM,NM,NM,NS
    NZ,PZ,PS,ZE,PS,PM,NM,NM,NS
    ZE,PS,PS,PZ,PM,PM,NS,NS,NS
    ];
    % Knowledge Base in tabular format.
    ESTIMATOR_KB = [
    ZE,ZE,ZE,ZE,PM,ZE,ZE,ZE,ZE
    ZE,ZE,ZE,ZE,PM,ZE,NZ,NZ,NZ
    ZE,ZE,ZE,ZE,PS,ZE,NS,NS,NS
    ZE,ZE,ZE,ZE,ZE,ZE,NM,NM,NM
    ZE,ZE,ZE,ZE,ZE,ZE,NB,NB,NB
    NZ,NZ,NZ,ZE,ZE,ZE,NB,NB,NB
    NS,NS,NS,ZE,ZE,ZE,NB,NB,NB
    ];
    % Zero the height method defuzzification counters.
    sum_a = 0;
    sum_b = 0;
    sum_c = 0;
    sum_d = 0;
    % Find the final output by using the height method.
    for i = 1:7
        for j = 1:9
            sum_a = sum_a + KB(i,j) * result(i,j);
            sum_b = sum_b + result(i,j);
            sum_c = sum_c + ESTIMATOR KB(i,j) * result(i,j);
            sum_d = sum_d + result(i,j);
        end
    end
    delta_u = sum_a/sum_b;
    delta_estimate = sum_c/sum_d;
    % Update all the states.
    x(1:12) = u;
    x(13) = x(13)+delta_u*100;
    x(14) = x(14)+0.02;
    x(15) = norm_slip_delta;
    x(16) = norm_current_delta;
    x(17) = norm_slip_error;
    x(18) = delta_u;
    x(19) = max(0.02,min(0.25,x(19)+delta_estimate*0.01));
    x(20) = delta_estimate;
    tmp =
                [stability_measure,norm_current_delta,norm_slip_delta,norm_s
                lip_error,delta_u,delta_estimate]
        sys = x;
    else
        sys = x;
    end
% Set the system outputs.
elseif flag == 3
    sys = [x(13),x(15),x(16),x(17),x(18),x(19),x(20)];
% Initialize the system setting and states.
elseif flag == 0
    sys = [0,20,7,12,0,0];
    x0 = [-1*ones(1,6),zeros(1,6),8400,0,0,0,0,0,0.08,0];
% Set the Next Run Time.
elstif flag == 4
    sys = t + 0.020:
else
    sys=[];
else
```

What is claimed is:

1. A traction control system for controlling the traction of a locomotive, said locomotive including drive wheels for riding on locomotive rails, said drive wheels being driven by electric drive wheel traction motors, said drive wheel traction motors being controlled by a locomotive generator, said traction control system comprising:

a generator controller being responsive to generator control signals, said generator controller outputting a field current reference signal to a field current controller that controls a field current of the generator so as to control a current input of the traction motors and the rotation of the drive wheels;

a fuzzy logic slip controller operable to provide a generator current reference signal to the generator controller in order to modify the field current reference signal so as to cause the generator to drive at least one of the locomotive drive wheels at a predetermined amount of wheel slip with respect to the rails, said fuzzy logic slip controller including means for defining the predetermined amount of wheel slip by representing a plurality of input variables with a set of fuzzy logic membership functions and a set of fuzzy logic rules; and a fuzzy logic slip reference estimator operable to provide a wheel slip reference signal to the fuzzy logic slip controller in order to adjust the generator current reference signal so as to cause the wheel slip of the at least one drive wheel to attempt to maximize the coefficient of friction between the at least one drive wheel and the rails depending on the condition of the rails, said fuzzy logic slip reference estimator including means for defining the wheel slip reference signal by representing the input variables with a set of fuzzy logic membership functions and a set of fuzzy logic rules, wherein the set of fuzzy logic rules for the fuzzy logic reference estimator is different than the set of fuzzy logic rules for the fuzzy logic slip controller.

2. The traction control system according to claim 1 wherein the fuzzy logic slip controller and the fuzzy logic slip reference estimator receive input signals indicative of the rotational speeds of the drive wheels, the locomotive ground speed, and the traction motor currents.

3. The traction control system according to claim 1 wherein the fuzzy logic slip controller includes means for determining a stability function as representative of whether a friction and wheel slip relationship between the at least one drive wheel and the rails is in a stable, peak or unstable region, said stability function being determined by a relationship between a change in the traction motor current driving the at least one drive wheel from a previous sample time to a current sample time and a change in the wheel slip of the at least one drive wheel from the previous sample time to the current sample time.

4. The traction control system according to claim 3 wherein the fuzzy logic slip controller includes fuzzification means for fuzzifying a wheel slip error, the change in the wheel slip, and the stability function, said wheel slip error being indicative of the difference between the actual wheel slip of the at least one drive wheel and the wheel slip reference signal.

5. The traction control system according to claim 4 wherein the change in the wheel slip, the wheel slip error and the stability function are normalized prior to being fuzzified by the fuzzification means, and the change in the traction motor current is normalized prior to determining the stability function.

6. The traction control system according to claim 4 wherein the fuzzification means assigns a membership function set for each of the change in the wheel slip, the wheel slip error and the stability function, wherein each membership function set includes a predetermined number of membership functions.

7. The traction control system according to claim 6 wherein the membership function set for the change in the wheel slip includes negative, zero and positive membership functions, the membership function set for the stability function includes stable, peak and unstable membership function, and the membership function set for the wheel .slip error includes negative big, negative medium, negative small, zero even, positive small, positive medium, and positive big membership functions.

8. The traction control system according to claim 6 wherein the fuzzy logic slip controller further includes an inference engine and a knowledge base, said knowledge base being represented by a predetermined number of rules, wherein the inference engine receives membership function values from the fuzzification means depending on a particular wheel slip error, a change in wheel slip and a stability with respect to the applicable membership function, and utilizes the rules of the knowledge base to determine an output of the inference engine.

9. The traction control system according to claim 8 wherein the knowledge base includes a different set of rules depending on whether the stability function is in a peak, stable or unstable region of the friction and wheel slip relationship.

10. The traction control system according to claim 8 wherein the inference engine determines the degree of applicability for each rule of the knowledge base depending on the membership function values, wherein the degree of applicability is the minimum membership function value for the rule.

11. The traction control system according to claim 10 wherein the fuzzy logic slip controller further includes defuzzification means for determining an output of the slip controller based on the degree of applicability for each rule.

12. The traction control system according to claim 11 wherein the defuzzification means uses a height defuzzification method in order to take a weighted average of an output membership function center of gravity to determine the output of the fuzzy logic slip controller, wherein the degree of applicability and a midpoint membership function value for each rule are used to determine the weighted average.

13. The traction control system according to claim 11 wherein an output membership function set is used to determine the membership function value for the midpoint value for each rule.

14. The traction control system according to claim 1 wherein the fuzzy logic slip controller includes means for selecting the drive wheel with the fastest rotation.

15. The traction control system according to claim 1 wherein the fuzzy slip reference estimator includes means for determining a stability function as representative of whether a friction and wheel slip relationship between the at least one drive wheel and the rails is in a stable, peak or unstable region, said stability function being determined by a relationship between a change in the traction motor current driving the at least one drive wheel from a previous sample time to a current sample time and a change in the wheel slip of the at least one drive wheel from the previous sample time to the current sample time.

16. The traction control system according to claim 15 wherein the fuzzy slip reference estimator includes fuzzification means for fuzzifying a wheel slip error, the change in the wheel slip, and the stability function, said wheel slip error being indicative of the difference between the actual wheel slip of the at least one drive wheel and the wheel slip reference signal.

17. The traction control system according to claim 16 wherein the change in wheel slip, the wheel slip error and the stability function are normalized prior to being fuzzified by the fuzzification means, and the change in the traction motor current is normalized prior to determining the stability function.

18. The traction control system according to claim 16 wherein the fuzzification means assigns a membership function set for each of the change in the wheel slip, the wheel slip error and the stability function, wherein each membership function set includes a predetermined number of membership functions.

19. The traction control system according to claim 18 wherein the membership function set for the change in the wheel slip includes negative, zero and positive membership functions, the membership function set for the stability function includes stable, peak and unstable membership functions, and the membership function set for the wheel slip error includes negative big, negative medium, negative small, zero even, positive small, positive medium, and positive big membership functions.

20. The traction control system according to claim 18 wherein the fuzzy slip reference estimator further includes an inference engine and a knowledge base, said knowledge base being represented by a predetermined number of rules, wherein the inference engine receives membership function values from the fuzzification means depending on a particular wheel slip error, a change in wheel slip and a stability with respect to the applicable membership function, and utilizes the rules of the knowledge base to determine an output of the inference engine.

21. The traction control system according to claim 20 wherein the knowledge base includes a different set of rules depending on whether the stability function is in a peak, stable or unstable region of the friction and wheel slip relationship.

22. The traction control system according to claim 20 wherein the inference engine determines the degree of applicability for each rule of the knowledge base depending on the membership function values, wherein the degree of applicability is the minimum membership function value for the rule.

23. The traction control system according to claim 22 wherein the fuzzy logic slip estimator further includes defuzzification means for determining an appropriate output of the slip controller based on the degree of applicability for each rule.

24. The traction control motor system according to claim 23 wherein the defuzzification means using a height defuzzification method in order to take a weighted average of an output membership function center of gravity to determine the wheel slip reference signal, wherein the degree of applicability and a midpoint membership function value for each rule are used to determine the weighted average.

25. The traction control system according to claim 22 wherein an output membership function set is used to determine the membership function value for the midpoint value for each rule.

26. The traction control system according to claim 23 wherein the output of the defuzzification means is scaled to provide a minimum slip reference and a maximum slip reference.

27. The traction control system according to claim 26 wherein the minimum wheel slip reference provides a wheel slip of 2% and the maximum wheel slip reference provides a wheel slip of 25%.

28. A traction control system for controlling the traction of a vehicle, said vehicle including at least one drive wheel for riding on a drive surface, said traction control system comprising:
control means for controlling the amount of power being applied to the at least one drive wheel in order to control the rotation of the drive wheel; and
fuzzy logic controller means for providing a drive wheel control reference signal to the control means so as to cause the control means to drive the at least one drive wheel at a predetermined amount of wheel slip between the at least one drive wheel and the drive surface, said fuzzy logic controller means generating a wheel slip reference signal indicative of a drive wheel slip which attempts to maximize the coefficient of friction between the at least one drive wheel and the drive surface.

29. The traction control system according to claim 28 wherein the fuzzy logic controller means includes a fuzzy logic slip controller that generates the drive wheel control reference signal.

30. The traction control system according to claim 29 wherein the fuzzy logic controller means further includes a fuzzy logic slip reference estimator which generates the slip reference signal so as to cause the wheel slip of the at least one drive wheel to maximize the coefficient of friction between the at least one drive wheel and the drive surface depending on the condition of the drive surface.

31. The traction control system according to claim 28 wherein the fuzzy logic controller means receives input signals indicative of the rotational speed of the least one drive wheel, the vehicle ground speed and the amount of power being applied to the at least one drive wheel.

32. The traction control system according to claim 28 wherein the fuzzy logic controller means includes means for determining a stability function as representative of whether a friction and wheel slip relationship between the at least one drive wheel and the drive surface is in a stable, peak or unstable region, said stability function being determined by a relationship between a change in the power driving the at least one drive wheel from a previous sample time to a current sample time and a change in the wheel slip of the at least one drive wheel from the previous sample time to the current sample time.

33. The traction control system according to claim 32 wherein the fuzzy logic controller means includes fuzzification means for fuzzifying a wheel slip error, the change in the wheel slip, and the stability function, said wheel slip error being indicative of the difference between the actual wheel slip of the at least one drive wheel and the wheel slip reference signal.

34. The traction control system according to claim 33 wherein the change in the wheel slip, the wheel slip error and the stability function are normalized prior to being fuzzified by the fuzzification means, and the change in the power is normalized prior to determining the stability function.

35. The traction control system according to claim 33 wherein the fuzzification means assigns a membership function set for each of the change in the wheel slip, the wheel slip error and the stability function, wherein each membership function set includes a predetermined number of membership functions.

36. The traction control system according to claim 35 wherein the membership function set for the change in the wheel slip includes negative, zero and positive membership functions, the membership function set for the stability function includes stable, peak and unstable membership functions, and the membership function set for the wheel slip error includes negative big, negative medium, negative small, zero even, positive small, positive medium, and positive big membership functions.

37. The traction control system according to claim 35 wherein the fuzzy logic controller means further includes an inference engine and a knowledge base, said knowledge base being represented by a predetermined number of rules, wherein the inference engine receives membership function values from the fuzzification means depending on a particular wheel slip error, a change in wheel slip and a stability with respect to the appropriate membership function, and utilizes the rules of the knowledge base to determine an output of the inference engine.

38. The traction control system according to claim 37 wherein the knowledge base includes a different set of rules depending on whether the stability function is in a peak, stable or unstable region of the friction and wheel slip relationship.

39. The traction control system according to claim 37 wherein the inference engine determines the degree of applicability for each rule of the knowledge base depending on the membership function values, wherein the degree of applicability is the minimum membership function value for the rule.

40. The traction control system according to claim 39 wherein the fuzzy logic controller means further includes defuzzification means for determining an output of the slip controller based on the degree of applicability for each rule.

41. The traction control system according to claim 40 wherein the defuzzification means uses a height defuzzification method in order to take a weighted average of an output membership function center of gravity to determine the output of the fuzzy logic controller means, wherein the weighted average is the degree of applicability and a midpoint membership function value for each rule are used to determine the weighted average.

42. The traction control system according to claim 40 wherein an output membership function set is used to determine the membership function value for the midpoint value for each rule.

43. A method of controlling the traction of at least one drive wheel of a vehicle relative to a drive surface, said method comprising the steps of:
controlling the amount of power being applied to the at least one drive wheel in order to control the rotation of the drive wheel; and
providing a drive wheel control reference signal to a control device controlling the amount of power being applied to the at least one drive wheel so as to drive the at least one drive wheel at a predetermined amount of wheel slip in order to attempt to maximize the coefficient of friction between the at least one drive wheel and the drive surface, said step of providing a drive wheel control reference signal includes the step of fuzzifying a change in the wheel slip.

44. The method according to claim 43 wherein the step of providing a drive wheel control reference signal includes determining a stability function as representative of whether a friction and wheel slip relationship between the at least one drive wheel and the drive surface is in a stable, peak or unstable region, wherein the stability function is determined by a relationship between a change in the power driving the at least one drive wheel from a previous sample time to a current sample time and the change in the wheel slip of the at least one drive wheel from the previous sample time to the current sample time.

45. The method according to claim 44 wherein the step of fuzzifying includes fuzzifying a wheel slip error, the change in the wheel slip, and the stability function, said wheel slip error signal indicative of the difference between the actual wheel slip of the at least one drive wheel and the wheel slip reference signal.

46. The method according to claim 45 wherein the change in the wheel slip, the wheel slip error and the stability function are normalized prior to being fuzzified by the fuzzification means, and the change in the power is normalized prior to determining the stability function.

47. The method according to claim 45 wherein the step of fuzzifying includes the steps of assigning a membership function set for each of the change in the wheel slip, the wheel slip error and the stability function, wherein each membership function step includes a predetermined number of membership functions, and determining membership function values for a particular wheel slip error, a change in wheel slip and a stability with respect to the applicable membership function.

48. The method according to claim 47 wherein the membership function set for the change in the wheel slip includes negative, zero and positive membership functions, the membership function set for the stability function includes a stable, peak and unstable membership function, and the membership function set for the wheel slip error includes negative big, negative medium, negative small, zero even, positive small, positive medium, and positive big membership functions.

49. The method according to claim 47 wherein the step of providing a drive wheel control reference signal includes the steps of applying the membership function values to an inference engine and applying a knowledge base to the inference engine, said knowledge base being represented by a predetermined number of rules, wherein the inference engine uses the rules of the knowledge base to determine an output of the inference engine depending on the membership function values.

50. The method according to claim 49 wherein the knowledge base includes a different set of rules depending on whether the stability function is in a peak, stable or unstable region of the friction wheel slip relationship.

51. The method according to claim 49 wherein the step of applying the membership function values to the inference engine includes determining a degree of applicability for each rule of the knowledge base depending on the membership function values.

52. The method according to claim 51 wherein the step of providing a drive wheel control reference signal includes defuzzifying an output of the inference engine based on the degree of applicability for each rule.

53. The method according to claim 52 wherein the step of defuzzifying includes using a height defuzzification method which takes a weighted average of an output membership function center of gravity to determine the output of the fuzzy logic controller means, wherein the degree of applicability and a midpoint membership function value for each rule are used to determine the weighted average.

54. The method according to claim 52 wherein the step of defuzzifying uses an output membership function set to determine the membership function value for the midpoint for each rule.

55. A traction control system for controlling the traction of a locomotive, said locomotive including drive wheels for riding on locomotive rails, said drive wheels being driven by electric drive wheel traction motors, said drive wheel traction motors being controlled by a locomotive generator, said traction control system comprising:

a generator controller being responsive to generator control signals, said generator controller outputting a field current reference signal to a field current controller that controls a field current of the generator so as to control a current input of the traction motors and the rotation of the drive wheels;

a fuzzy logic slip controller operable to provide a generator current reference signal to the generator controller in order to modify the field current reference signal so as to cause the generator to drive at least one of the locomotive drive wheels at a predetermined amount of wheel slip with respect to a rail, said fuzzy logic slip controller including means for selecting the drive wheel with the fastest rotation; and a fuzzy logic slip reference estimator operable to provide a wheel slip reference signal to the fuzzy logic slip controller in order to adjust the generator current reference signal so as to cause the wheel slip of the at least one drive wheel to attempt to maximize the coefficient of friction between the at least one drive wheel and the rails depending on the condition of the rails.

56. A traction control system for controlling the traction of a vehicle, said vehicle including at least one drive wheel for riding on a drive surface, said traction control system comprising:

control means for controlling the amount of power being applied to the at least one drive wheel in order to control the rotation of the drive wheel; and fuzzy logic controller means for providing a drive wheel control reference signal to the control means so as to cause the control means to drive the at least one drive wheel at a predetermined amount of wheel slip between the at least one drive wheel and the drive surface, said fuzzy logic controller means including a fuzzy logic slip controller that generates the drive wheel control reference signal and a fuzzy logic slip reference estimator that generates a wheel slip reference signal indicative of a drive wheel slip that attempts to maximize the coefficient of friction between the at least one drive wheel and the drive surface depending on the condition of the drive surface.

* * * * *